Patented Nov. 30, 1948

2,454,799

UNITED STATES PATENT OFFICE 2,454,799

METHOD OF PRODUCING PROTECTIVE COATINGS ON MAGNESIUM POWDER

David Hart and Henry J. Eppig, Dover, N. J.

No Drawing. Application December 9, 1944,
Serial No. 567,500

1 Claim. (Cl. 148—6.21)

(Granted under the act of March 3, 1883, as
amended April 30, 1928; 370 O. G. 757)

The invention described herein may be manufactured and used by or for the Government for governmental purposes without the payment to us of any royalty thereon.

The present invention relates to the treatment of powdered magnesium and powdered magnesium-aluminum alloys so as to produce a protective coating which renders the powdered metals more resistant to the reaction with moisture at normal and elevated temperatures.

Since magnesium and aluminum are very active metals high in the electromotive series, powdered magnesium and powdered magnesium-aluminum alloys react readily with water even at ordinary temperatures, liberating hydrogen. If such powdered metals, either alone or in igniter, tracer and pyrotechnic compositions, are stored at normal and elevated temperatures together with high relative humidity, they will react with the moisture and be rendered useless for the purposes for which they were intended.

We have discovered that by immersing the powdered magnesium or magnesium-aluminum alloys in a soluble metallic oxyacid solution formed from the metals of group VI(A) of the periodic system containing if desired up to about 0.2 percent sodium hydrogen sulfate for about half an hour at room temperature, a protective coating will be found directly on the magnesium or magnesium alloy which will render it much more resistant to the action of moisture. For convenience of description, the invention herein claimed will be described in its application to particular chromates, but it is to be understood that the invention is not to be limited thereto.

For example, 600 grams of powdered magnesium, about 48–100 mesh, are added to 1500 ml. of a 5 percent sodium dichromate aqueous solution containing 0.2 percent sodium hydrogen sulfate and mechanically stirred for about half an hour. The metal is then filtered, washed and dried at 50° C.

We have found that 10 grams of powdered magnesium which had been thus dichromated, does not give any reaction with water at room temperature in 24 hours and less than 1 ml. of hydrogen is produced in six days, changing the water each day, whereas 10 grams of untreated powdered magnesium reacts immediately at room temperature with water and yields 160 ml. of hydrogen gas in 24 hours. Similar results are obtained with finer granulations.

We have also found that a good protective coating which is moisture resistant, can be produced on powdered magnesium metal by immersing it in the dichromated solution alone, omitting the sodium hydrogen sulfate. In this case, however, better coatings are obtained by maintaining the temperature of the bath between 60° C. and 100° C.

In the case of powdered magnesium-aluminum alloys, we have discovered that they are rendered more resistant to the action of moisture by immersion in an aqueous solution of sodium dichromate at about the boiling temperature. For example, heat 1500 ml. of a 5 percent sodium dichromate solution to boiling, add 600 grams of powdered magnesium-aluminum alloy and stir mechanically for about half an hour, maintaining the temperature at about 90–100° C. The metal is then filtered, washed and dried at about 50° C. Here too, the dichromating aqueous solution may be varied to contain from 1–20 percent or more of any alkali dichromate or ammonium dichromate.

We have found that powdered magnesium and magnesium-aluminum alloys when dichromated by the above treatments are much more resistant to the action of moisture and more stable at elevated temperatures and high relative humidity than the untreated metals as well as those coated with linseed oil, high melting point waxes, high molecular weight fatty acids, resins, and synthetic plastics.

As examples, the following compositions have been particularly successful in satisfactory coating powdered magnesium so as to considerably improve its resistance to moisture:

| | Composition | Percent |
|---|---|---|
| 1 | Sodium dichromate | 5 |
| 2 | Sodium dichromate | 5 |
|   | Sodium hydrogen sulfate | 0.2 |
| 3 | Sodium dichromate | 10 |
|   | Sodium hydrogen sulfate | 0.1 |
| 5 | Potassium dichromate | 10 |
|   | Potassium hydrogen sulfate | 0.2 |
| 6 | Sodium tungstate | 5 |
| 7 | Sodium molybdate | 5 |

As further examples, the following compositions have been particularly successful in satisfactorily coating powdered magnesium-aluminum alloys so as to considerably improve their resistance to moisture.

| | Composition | Percent |
|---|---|---|
| 8 | Sodium dichromate | 5 |
| 9 | Sodium dichromate | 20 |
| 10 | Potassium dichromate | 10 |

While there have been presented herein certain specific examples, it is to be understood that the invention is to be limited only as defined by the scope of the appended claim.

We claim:

The method of producing a moisture resistant coating on magnesium powder which comprises contacting said powder for about half an hour at room temperature with a solution consisting of about 0.2 percent of an alkali metal hydrogen sulphate, from about 5 percent to about 10 percent of an alkali metal dichromate and the remainder water.

DAVID HART.
HENRY J. EPPIG.

REFERENCES CITED

The following references are of record in the file of this patent:

UNITED STATES PATENTS

| Number | Name | Date |
|---|---|---|
| 1,723,067 | Pacz | Aug. 6, 1929 |
| 1,783,770 | Beck et al. | Dec. 2, 1930 |
| 2,134,830 | Michel | Nov. 1, 1938 |
| 2,178,977 | Tosterud | Nov. 7, 1939 |
| 2,276,353 | Thompson | Mar. 17, 1942 |

FOREIGN PATENTS

| Number | Country | Date |
|---|---|---|
| 353,415 | Great Britain | July 14, 1931 |